W. C. SWIFT.
MOLDING MACHINE.
APPLICATION FILED MAR. 7, 1904.
910,028.
Patented Jan. 19, 1909.
3 SHEETS—SHEET 1.
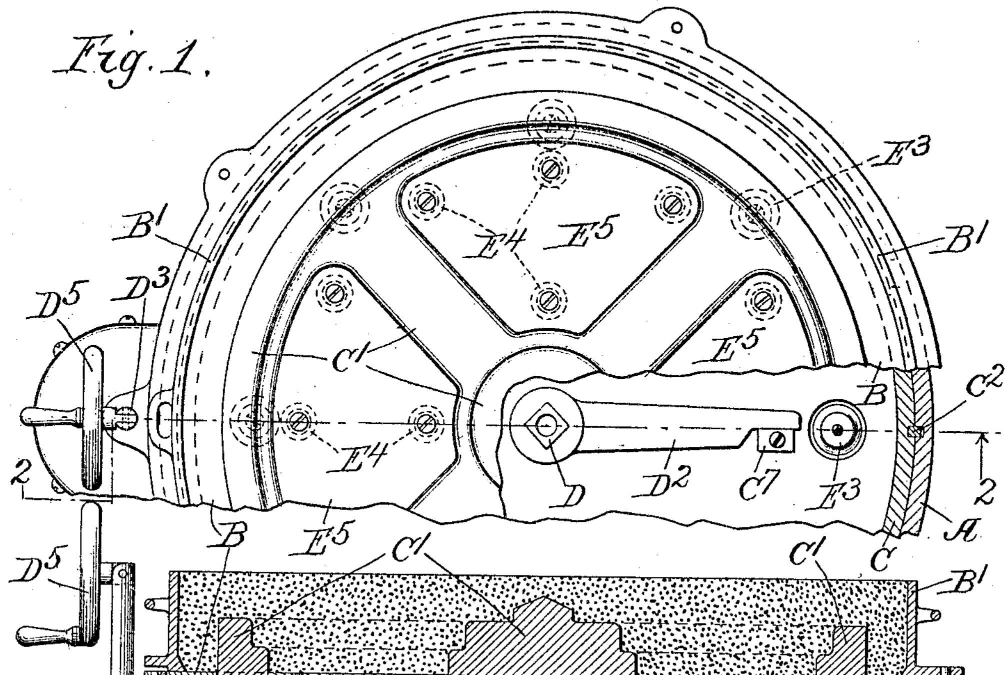
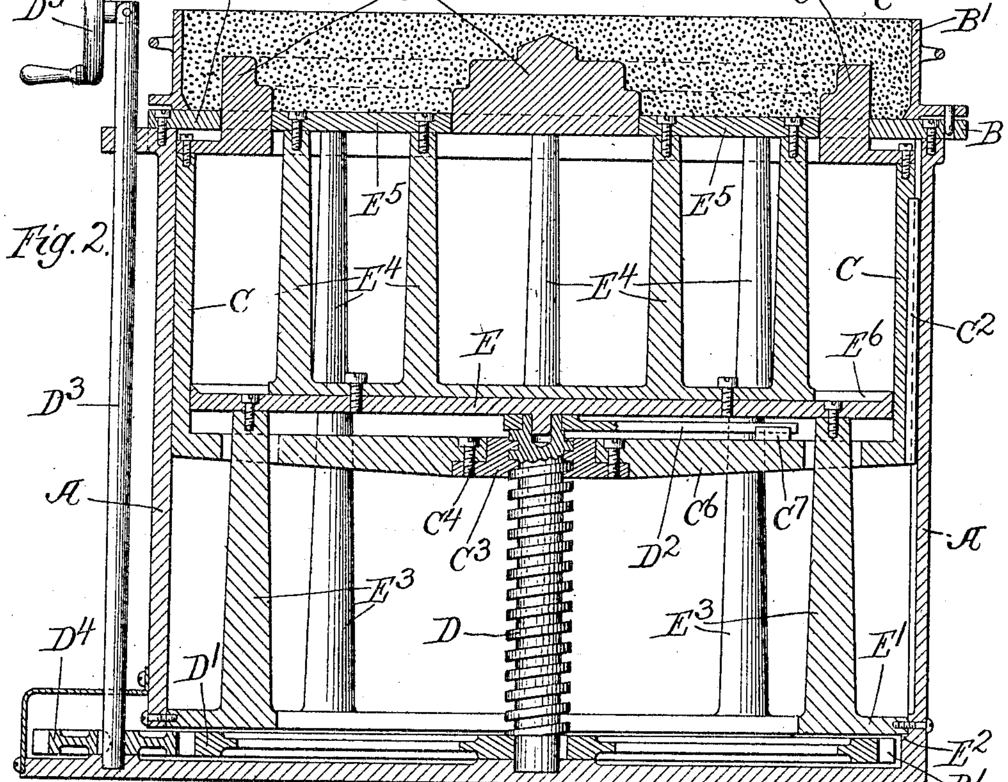
Witnesses.
Edward T. Wray.
Howard L. Kropf.
Inventor.
Willis C. Swift.
by Parker & Carter
Attorneys
THE NORRIS PETERS CO., WASHINGTON, D. C.

W. C. SWIFT.
MOLDING MACHINE.
APPLICATION FILED MAR. 7, 1904.
910,028. Patented Jan. 19, 1909.
3 SHEETS—SHEET 2.
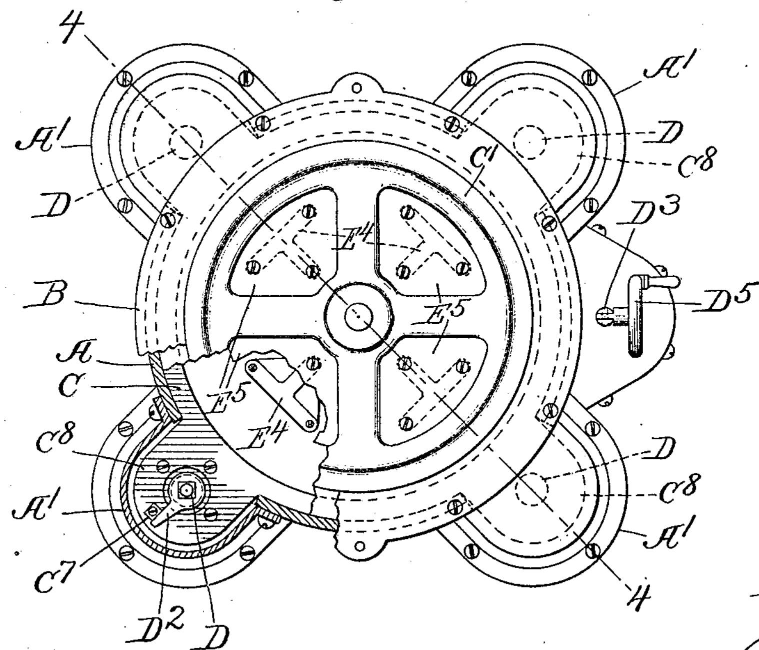
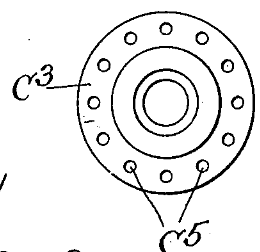
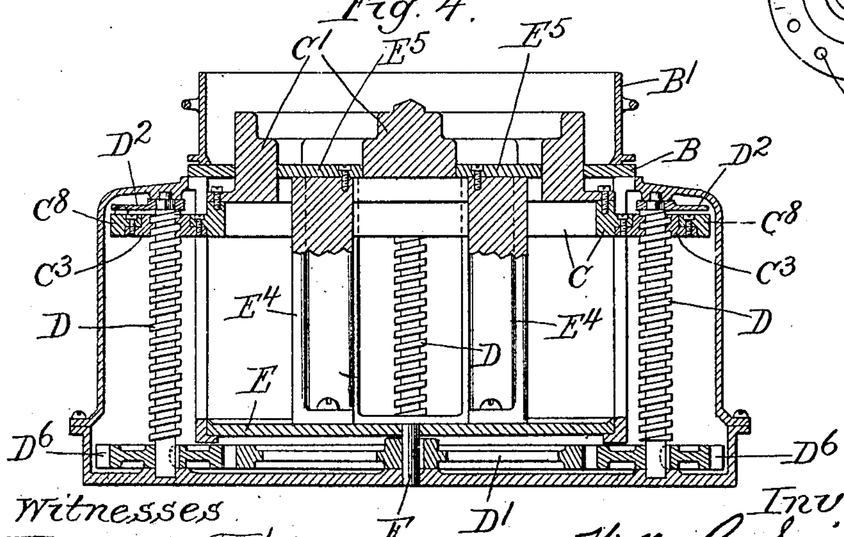
Witnesses
Edward T. Wray
Homer L. Kraft
Inventor.
Willis C. Swift
by Parker & Carter
Attorneys.
THE NORRIS PETERS CO., WASHINGTON, D. C.

W. C. SWIFT.
MOLDING MACHINE.
APPLICATION FILED MAR. 7, 1904.
910,028.
Patented Jan. 19, 1909.
3 SHEETS—SHEET 3.
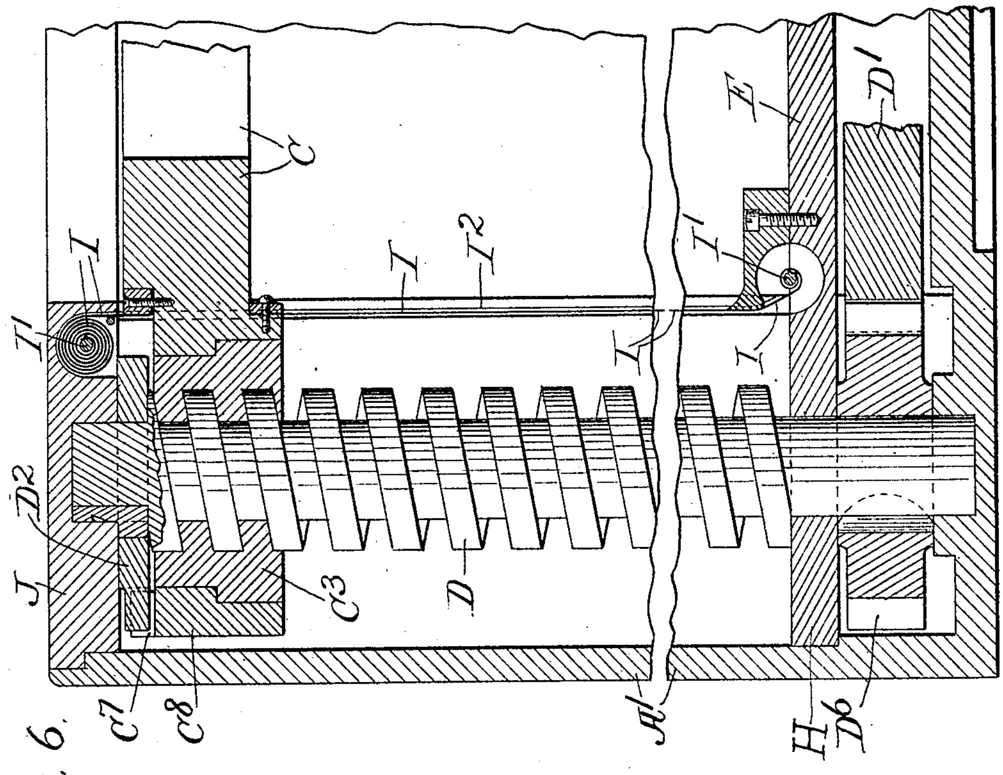
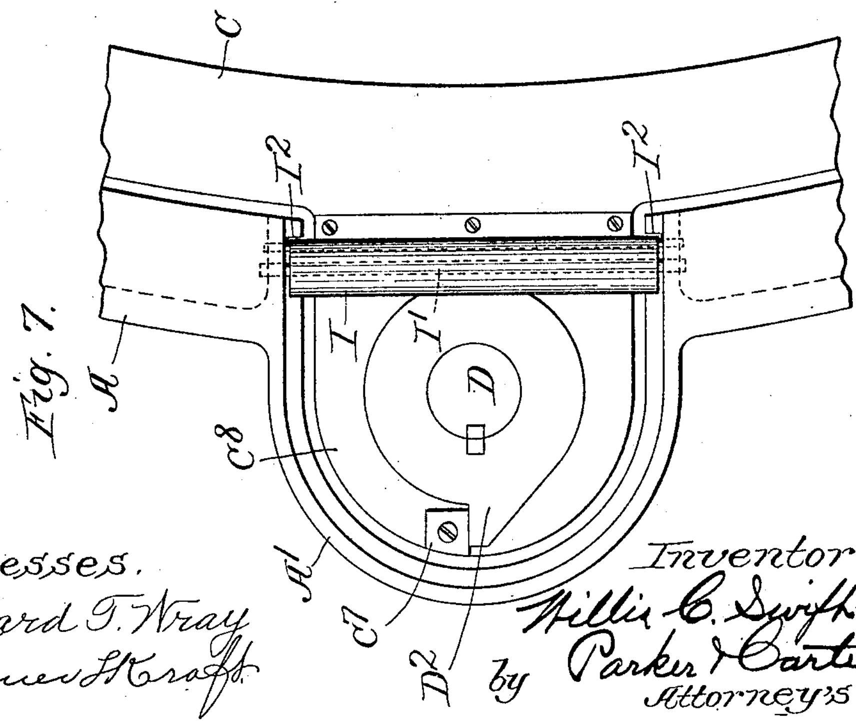
Witnesses.
Edward T. Wray
Homer L. Kraft
Inventor.
Willis C. Swift
by Parker & Carter
Attorneys.
THE NORRIS PETERS CO., WASHINGTON, D. C.

UNITED STATES PATENT OFFICE.

WILLIS C. SWIFT, OF CHAPPAQUA, NEW YORK.

MOLDING-MACHINE.

No. 910,028. Specification of Letters Patent. Patented Jan. 19, 1909.

Application filed March 7, 1904. Serial No. 196,799.

*To all whom it may concern:*

Be it known that I, WILLIS C. SWIFT, a citizen of the United States, residing at Chappaqua, in the county of Westchester and State of New York, have invented a certain new and useful Improvement in Molding-Machines, of which the following is a specification.

My invention relates to molding machines, and has for its object to provide a new and improved machine of this description.

My invention is illustrated in the accompanying drawings, wherein—

Figure 1 is a plan view of one form of molding machine embodying my invention; Fig. 2 is a sectional view on line 2—2, Fig. 1; Fig. 3 is a plan view showing a different construction; Fig. 4 is a section on line 4—4, Fig. 3; Fig. 5 is a view of one of the adjustable nuts for the actuating screw. Fig. 6 is a vertical section through a portion of the casing, showing a modified construction. Fig. 7 is a plan view of the device shown in Fig. 6 with the top or cover of the casing removed.

Like letters refer to like parts throughout the several figures.

Referring now to Figs. 1 and 2, I have shown a sand molding machine consisting of a casing, A, which is supported upon its bottom, and which acts as the support for the stripping plate, B, and the flask, $B^1$. Within the casing, A, is a reciprocating pattern carrier, C, upon which is mounted the pattern, $C^1$. This pattern carrier preferably engages the inner face of the casing around its periphery, such periphery being preferably substantially continuous. In these figures the casing is cylindrical, and the pattern carrier is prevented from rotating in any desired manner as by means of the spline, $C^2$. It will be seen that this spline permits the free reciprocation of the pattern carrier, but prevents the rotation within the casing. The pattern carrier is reciprocated by means of one or more screws. As shown in Fig. 1, there is employed a central shaft or screw, D, which engages threads associated with the pattern carrier. This screw rests at one end upon the bottom of the casing, A, and at the other end engages a piece or plate, E, located between the upper and lower parts of the pattern carrier. Means are associated with the screw, D, for rotating it, the bearings for the screw being at the ends thereof, as shown.

Some means is provided for adjusting the parts when the threads of the screw wear so as to take up this wear, and keep the pattern carrier in the proper position and at the proper height. It will be seen, for example, that unless such an adjusting device is provided the pattern carrier will drop down slightly as the screw threads wear. As shown in Fig. 2, this adjustment is secured by having the part of the pattern carrier provided with the threads separate from the remaining part, or, in other words, by providing a threaded nut, $C^3$, adjustably connected with the bottom of the pattern carrier, as by means of the screws, $C^4$. This nut is preferably provided with a series of holes, $C^5$, for the screws, $C^4$, arranged at proper intervals. When it is desired to adjust the parts on account of the wear of the threads or for any other reason, the screws or bolts, $C^4$, are taken out and the nut, $C^3$, given a partial rotation, the amount of rotation depending upon the amount of adjustment required. The nut is then again fastened to the bottom of the pattern carrier by the screws or bolts, $C^4$. It will thus be seen that any desired adjustment can be secured in this manner.

Connected at the lower end of the screw D is a power or a gearing wheel, $D^1$. This wheel is contained within the casing, A. Above this wheel is located a supporting piece, $E^1$, which is held in position in any desired manner, as by a shoulder or the like, $E^2$, on the inner face of the casing, A. Suitable supports, $E^3$, are connected with this supporting piece and pass through openings in the bottom, $C^6$, of the pattern carrier and act to support the piece or plate, E, upon which are supported the stools, $E^4$, which support the plate, $E^5$. The plate or piece, E, preferably fits within the pattern carrier, and is provided with an upturned edge, $E^6$, so that any sand or dirt which may drop into the casing will be collected by the plate E, and will thus be prevented from falling down into the operating mechanism.

I prefer to provide some means for limiting the movement of the pattern carrier. Any suitable means for this purpose may be used. As herein shown, an arm or projecting part, $D^2$, is connected with the upper end of the screw so as to rotate therewith. The bottom of the pattern carrier is provided with a projection, $C^7$, the parts being arranged so that when the pattern carrier reaches its maximum upward position the projection $C^7$ engages the projection $D^2$ and stops the further rotation of the screw. An operating device is provided on the outside of the casing, A, and a suitable connection with the screw D is made so that said screw may be rotated. As herein shown, a shaft, $D^3$, is located exterior to the casing, and extends along the side thereof in a vertical position, said shaft being provided with a gear, $D^4$, which engages the gear $D^1$. This shaft may be rotated in any desired manner, as, for example, by means of the hand wheel, $D^5$, connected therewith. Said hand wheel is preferably pivotally connected with the shaft so that it may be turned upon one side, as shown, and thus be out of the way of the flask.

Instead of employing a single central screw I may employ a series of screws located at various positions. One form of such a construction is shown in Figs. 3 and 4, wherein there is illustrated four screws, D; the casing A being provided with projecting parts, $A^1$, which extend outwardly and form chambers or apartments for said screws. This construction is particularly adapted for large and heavy patterns. In this construction the pattern carrier is provided with projecting parts, $C^8$, which project into the chambers formed by the portions $A^1$ of the casing, and the threaded nuts $C^3$ are connected with these projecting parts and are similar to those shown in Fig. 2, so that proper adjustment may be secured. The power or gear wheel, or other suitable power transmitting device, $D^1$, in this case is mounted within the casing and the shaft upon which it is mounted instead of being one of the screws is a shaft F having one bearing in the bottom casing, and the other in the part or plate E, this plate being mounted nearer the bottom of the casing than is shown in Fig. 2. The screws D are each provided with a gear $D^6$ all of said gears $D^6$ engaging the gear or power wheel $D^1$ so that a uniform movement of the screws is secured. The shaft $D^3$ in this case is located in any convenient position, and is provided with a suitable hand wheel, crank or the like. I prefer to use the separate shaft as the power shaft, although one of the screws might be provided with a projecting end and be used for this purpose. I prefer to provide each of the screws, D, with the stopping device, consisting of the projections $D^2$ and $C^7$.

When a multiple screw machine is used I prefer to arrange means for preventing the dust, dirt or sand from coming into contact with the screws. In Figs. 6 and 7 I have shown such a construction. In these figures I have simply illustrated one of the projecting parts $A^1$ of the casing with the screw D in position. In this construction the plate E is provided with lugs or projections H which extend through the openings into the projecting parts $A^1$. The projectionc $C^8$ on the pattern carrier C project through this opening communicating with the parts $A^1$ of the casing and move up and down in this space as the pattern carrier is moved up and down. If this space is left open dirt or dust or sand which may drop through the stripping plate is apt to come into contact with the screws, and cause wearing and other evils. In order to prevent this I prefer to provide a dust excluding device for these openings. This dust excluding device may be formed in any desired manner. As herein shown I have provided a curtain I of proper width to extend across this opening and attached to the pattern carrier C. This curtain is preferably a thin leaf spring coiled on a revolving shaft $I^1$ so that it will be wound and unwound when the pattern carrier moves up and down. I also provide below the pattern carrier a similar curtain which is preferably carried by the pattern carrier, and connected to the plate E. It will be seen that by this means the opening leading from the main casing into the part $A^1$ of the casing will be at all times closed regardless of the position of the pattern carrier, and hence the sand and dust and dirt are excluded from the screws. The upper curtain is preferably made of spring steel and strong enough to exert some lifting power as the pattern carrier moves upward. The lower curtain need not have this spring effect. The casing is provided with slots $I^2$ into which the edges of the dust excluding device project so as to prevent the dust from getting around these edges. When this construction is used the portions $A^1$ of the casing are preferably provided with removable covers J which are cut away to receive the upper curtain roll. These covers have openings for the ends of the screws, and act as bearings therefor.

In Figs. 6 and 7 a modified form of stopping device is illustrated. In these figures the stop arm $D^2$ consists of an annular piece keyed to the screw and provided with a suitable projection which engages the projection $C^7$ connected with the part $C^8$ of the pattern carrier.

I have described in detail a certain construction embodying my invention, but it is, of course, evident that the parts may be varied in many particulars, and some of the parts omitted and others used with parts not herein shown without departing from the spirit of my invention.

The use and operation of my invention are as follows: When the device shown in Fig. 1 is used the flask is placed in position and the pattern carrier will be in its lowered position with a suitable pattern thereon. The hand wheel $D^5$ is then moved to a horizontal position and rotated. This rotates the shaft $D^3$ which by means of the gears $D^4$ and $D^1$ rotates the screw D. This screw by means of its engagement with the nut $C^3$ attached to the bottom of the pattern carrier moves said pattern carrier upwardly. When the pattern carrier has moved upwardly a sufficient distance the projection $C^7$ engages the projection $D^2$ and further movement of the pattern is prevented. These parts are arranged so that the pattern is in its operative position when said parts engage and the movement is stopped, that is, the pattern projects through the opening in the stripping plate so as to project into the flask the proper amount. The sand is now placed in the flask and properly rammed. When it is desired to withdraw the pattern from the sand, the hand wheel is turned in the opposite direction. This causes the power transmitting device and the screw to rotate in such a manner as to lower the pattern carrier, which in turn moves the pattern downwardly through the opening in the stripping plate, and out of the sand, such sand being supported by the stripping and stool plates during this movement.

It will be seen that by means of this construction a slow and perfectly steady and sure movement of the pattern carrier is obtained during the withdrawal of the pattern from the sand, and thus uniform and satisfactory results may be secured. It will further be seen that the parts are substantially all inclosed in the casing A, and that the sand which may escape from the flask is prevented from coming in contact with the mechanism because of the intervening plate or partition E. This plate in addition to keeping the sand out of the screw and other mechanism provides a bearing for the shaft of the power wheel or gear $D^1$, and also acts as a stool plate, and when a central screw is used holds the screw down and keeps it in its proper position. When the pattern is very heavy, or a shorter machine is desired, instead of using the central screw I may use a series of screws as shown in Figs. 3 and 4, and connect them by some suitable mechanism so that they will rotate in unison.

I claim:

1. A molding machine comprising an exterior protecting casing, within which the operating mechanism is contained and open at one end, a flask mounted thereon so as to cover the open end of the casing, a reciprocating pattern carrier mounted within said casing, means for reciprocating the carrier comprising a vertical screw connected with the pattern carrier, a power wheel within the casing, a connection between said power wheel and said screw or screws, and a stop device comprising a fixed part and a rotating part adapted when brought into contact to stop the carrier at a predetermined point.

2. A molding machine comprising a casing, a pattern carrier, a rotating part in the casing below the pattern carrier having a connection with the pattern carrier, an intermediate part or plate extending across the pattern carrier and acting as a barrier to prevent sand from falling upon the pattern carrier and its connections, and a bearing associated with the plate for the shaft of the rotating part.

3. A molding machine comprising an exterior casing, a flask mounted thereon, a pattern carrier within said casing, a horizontal partition extending across the casing and dividing it into two chambers, a power transmitting device in one of said chambers, and a connection between said power transmitting device and said pattern carrier said partition protecting the power transmitting device and its connections from falling sand.

4. A molding machine comprising a support, a pattern carrier mounted thereon, a vertical screw-threaded shaft associated with said pattern carrier, a threaded nut rotatably set in said carrier and removably fastened thereto, and through which said shaft passes, said threaded nut adjustably connecting the shaft with the pattern carrier so as to vary the limit of motion of the carrier, and a holding part passing through said carrier and said nut so as to positively lock them together.

5. A molding machine comprising a casing provided with a bottom-piece, a pattern carrier mounted in said casing, a rotating device within the casing mounted so as to bear upon the bottom thereof, and a connection comprising a rotating shaft, and means for holding the same from vertical movement, said shaft fixed to said rotating device so as to rotate therewith.

6. A molding machine comprising a casing having a series of sections communicating with each other, a pattern carrier in one section, an actuating part therefor in another section, a connection between the actuating part and the pattern carrier and a movable dust excluding device between the two sections.

7. A molding machine comprising a casing provided with a series of extensions, a pattern carrier mounted in said casing, actuating devices therefor located in said extensions, a suitable connection between the pattern carrier and said actuating devices, and a movable dust excluding device associated with each extension so as to separate it from the main casing.

8. A molding machine comprising a casing, a flask mounted thereon, a reciprocating pattern carrier in said casing, a series of extensions to said casing, actuating devices for the pattern carrier located in said extensions, a connection between the pattern carrier and said actuating devices, and a flexible dust excluding curtain extending across the opening leading from each of said extensions to the main casing, said curtain mounted so as to be expanded and contracted as the pattern carrier is moved up and down.

9. A molding machine comprising a frame with a series of sections, a pattern carrier between said sections, an actuating part for said pattern carrier in each of said sections, a connection between each of the actuating parts and the pattern carrier, and a movable dust excluding device associated with each of said sections.

10. A molding machine comprising a casing, a pattern carrier, operating mechanism therefor at the bottom of the casing, and a stationary protecting device between the pattern carrier and said mechanism for preventing sand from falling thereon.

11. A molding machine comprising a casing, a pattern carrier mounted therein, a gear wheel near the bottom of said casing and parallel thereto, and a plate extending across the casing between the pattern carrier and said gear wheel and arranged to prevent the sand from falling on the gear wheel, a series of fixed supports from said plate.

12. A molding machine comprising a casing, a pattern carrier mounted therein comprising two parts adapted to move together in the direction of the length of said casing and with a space between them, and a stationary plate between said parts and adapted to catch any sand that may fall into said space.

WILLIS C. SWIFT.

Witnesses:
HOMER L. KRAFT,
EDWARD T. WRAY.